(12) United States Patent
Fulton

(10) Patent No.: US 10,842,087 B2
(45) Date of Patent: Nov. 24, 2020

(54) TREE NET ASSEMBLY

(71) Applicant: Burton Fulton, Parkersburg, WV (US)

(72) Inventor: Burton Fulton, Parkersburg, WV (US)

( * ) Notice: Subject to any disclaimer, the term of this patent is extended or adjusted under 35 U.S.C. 154(b) by 234 days.

(21) Appl. No.: 15/985,877

(22) Filed: May 22, 2018

(65) Prior Publication Data

US 2019/0357453 A1 Nov. 28, 2019

(51) Int. Cl.
*A01G 13/10* (2006.01)
*A01G 13/04* (2006.01)

(52) U.S. Cl.
CPC ............ *A01G 13/10* (2013.01); *A01G 13/043* (2013.01); *A01G 2013/046* (2013.01)

(58) Field of Classification Search
CPC .... A01G 13/10; A01G 13/043; A01G 13/105; A01G 13/046
USPC ................................ 47/20.1, 23.1, 29.5, 29.6
See application file for complete search history.

(56) References Cited

U.S. PATENT DOCUMENTS

| | | |
|---|---|---|
| 1,126,426 A | 1/1915 | Eddy |
| 2,666,426 A | 1/1954 | Pollard |
| 3,466,799 A | 9/1969 | McComb |
| 3,706,160 A * | 12/1972 | Deibert ................ A01G 13/043 47/23.2 |
| 4,327,520 A * | 5/1982 | Saxby ................ A01G 13/0212 47/29.1 |
| 4,787,173 A | 11/1988 | Lewis |
| 4,901,513 A | 2/1990 | Kim |
| 5,090,155 A | 2/1992 | Rodgers |
| 5,456,043 A * | 10/1995 | Dacon, Sr. ............. A01G 13/10 47/23.2 |
| 5,579,610 A * | 12/1996 | Jackson ................ A01G 20/30 52/4 |
| D424,974 S * | 5/2000 | Cook .......................... D11/164 |
| 7,637,053 B1 | 12/2009 | McAnulty |
| 7,941,966 B2 * | 5/2011 | Foix Robert .......... A01G 13/10 47/24.1 |
| 8,079,176 B1 * | 12/2011 | Thead ................ A01G 13/0212 47/29.6 |
| 8,161,680 B1 * | 4/2012 | Sloan ................... A01G 13/043 47/29.6 |
| 8,205,626 B2 * | 6/2012 | Myers ................... A01M 31/02 135/90 |
| 10,130,046 B1 * | 11/2018 | Cameron ........... A01G 13/0206 |

(Continued)

OTHER PUBLICATIONS http://web.archive.org/web/20170704002413/http://www.econym.demon.co.uk/holetut/holes2.htm Iso-Holes by Mike Williams Jul. 4, 2017 (Year: 2017).*

(Continued)

*Primary Examiner* — Marc Burgess
*Assistant Examiner* — Shada Mohamed Alghailani

(57) ABSTRACT

A tree net assembly includes a pole vertically oriented and positioned adjacent to a plant. Each of a pair of globes is slidably positioned around the pole, and each of the globes has a plurality of wells each extending toward a center of a respective one of the globes. each of a pair of rods is comprised of a resiliently bendable material. Each of the rods is removably coupled between the globes when the globes are positioned on the pole. The globes are spaced apart from each other a distance less than a length of the rods. The rods curve outwardly from the pole between the globes such that the rods define a sphere surrounding the plant. A net is positionable around the rods to surround the plant.

12 Claims, 7 Drawing Sheets

(56) References Cited

U.S. PATENT DOCUMENTS

| | | | | |
|---|---|---|---|---|
| 10,412,905 | B2* | 9/2019 | Kish | A01G 13/10 |
| 2004/0099299 | A1* | 5/2004 | Wu | E04H 15/28 |
| | | | | 135/98 |
| 2005/0138851 | A1* | 6/2005 | Ingraselino | G09F 13/00 |
| | | | | 40/442 |
| 2006/0185708 | A1* | 8/2006 | Sylvestre | A01G 13/043 |
| | | | | 135/135 |
| 2010/0024294 | A1* | 2/2010 | Kertz | A01G 13/0212 |
| | | | | 47/29.1 |
| 2012/0005952 | A1* | 1/2012 | Lohse | A01G 13/043 |
| | | | | 47/21.1 |
| 2013/0219783 | A1* | 8/2013 | Toye | A01G 13/043 |
| | | | | 47/31 |
| 2014/0026475 | A1* | 1/2014 | Centeno | A01G 13/02 |
| | | | | 47/29.5 |
| 2017/0188524 | A1* | 7/2017 | di Muro | A01G 9/128 |

OTHER PUBLICATIONS https://www.youtube.com/watch?time_continue=238&v=bfGkzDZWt-c&feature=emb_logo the History of the Times Square Ball Mintues 3.00-4.00 (Year: 2017).* https://www.core77.com/posts/59362/Explaining-Hardware-Set-Screws Explaining Hardware: Set Screws by Rain Noe Jan. 5, 2017<br> (Year: 2017).*

* cited by examiner

_US 10,842,087 B2_

TREE NET ASSEMBLY

CROSS-REFERENCE TO RELATED APPLICATIONS

I hereby claim the benefit under 35 U.S.C. Section 119(e) of United States Provisional application (62/533,467)(Aug. 17, 2017)

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to net devices and more particularly pertains to a new net device for keeping animal pests from accessing foliage on a tree.

BRIEF SUMMARY OF THE INVENTION

An embodiment of the disclosure meets the needs presented above by generally comprising a pole that is vertically oriented and is positioned adjacent to a plant. Each of a pair of globes is slidably positioned around the pole, and each of the globes has a plurality of wells each extending toward a center of a respective one of the globes. A plurality of rods is provided and each of the rods is comprised of a resiliently bendable material. Each of the rods is removably coupled between the globes when the globes are positioned on the pole. Moreover, the globes are spaced apart from each other a distance that is less than a length of the rods. Thus, the rods curve outwardly from the pole when the rods are coupled between the globes thereby facilitating the plurality of rods to define a sphere surrounding the plant. A net is positionable around the rods when the rods are positioned in the globes having the net surrounding the plant. In this way the net inhibits animal pests from accessing the plant.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
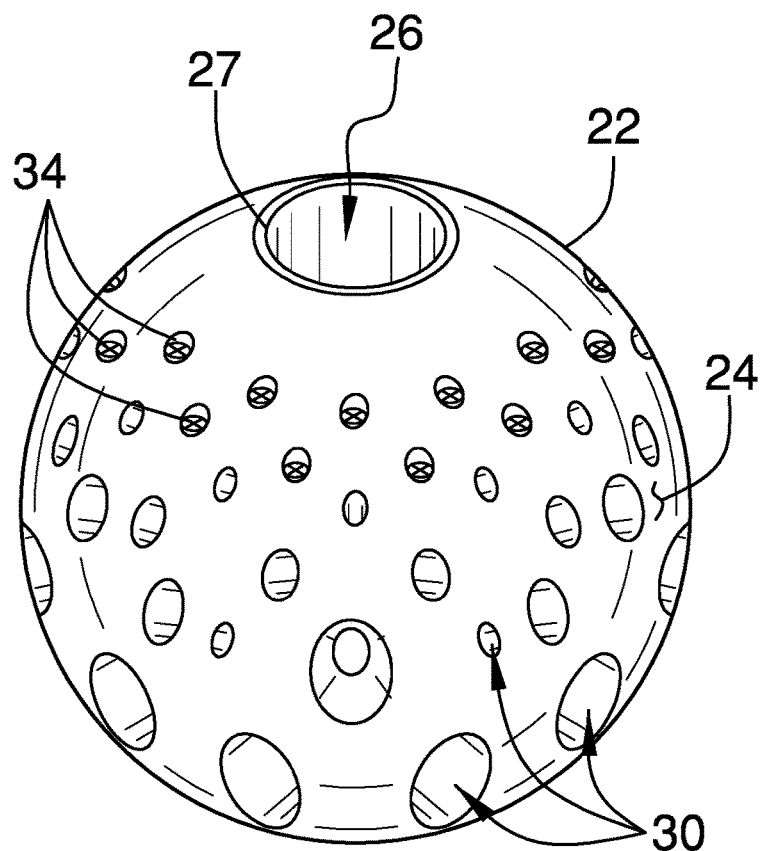
FIG. 1 is a top perspective view of a globe of a tree net assembly according to an embodiment of the disclosure.
Figure 2:
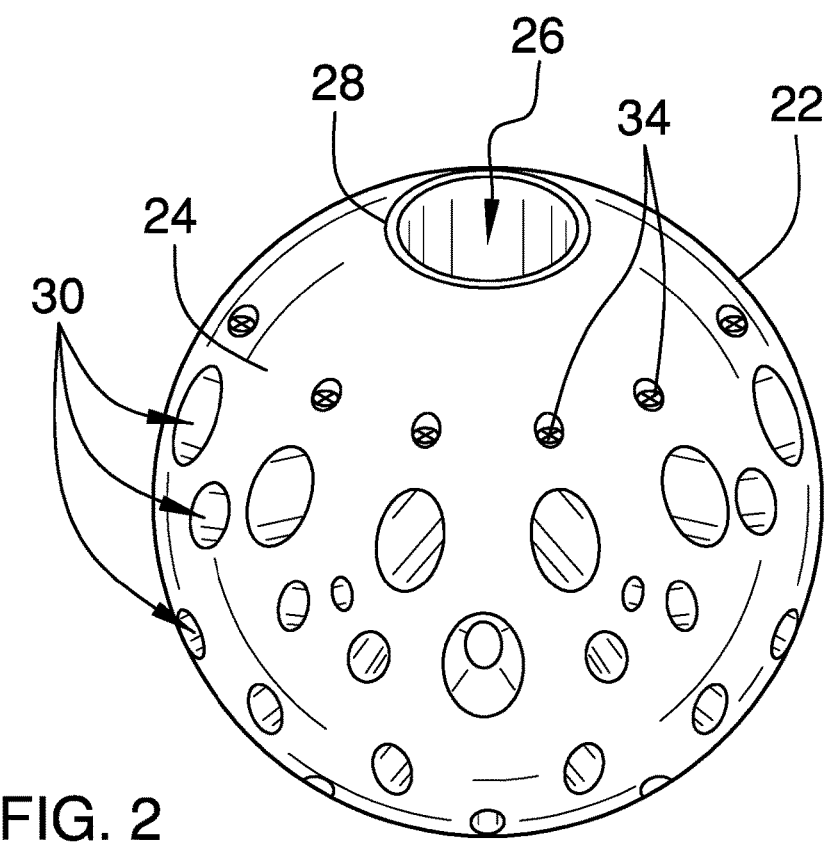
FIG. 2 is a bottom perspective view of globe of an embodiment of the disclosure.
Figure 3:
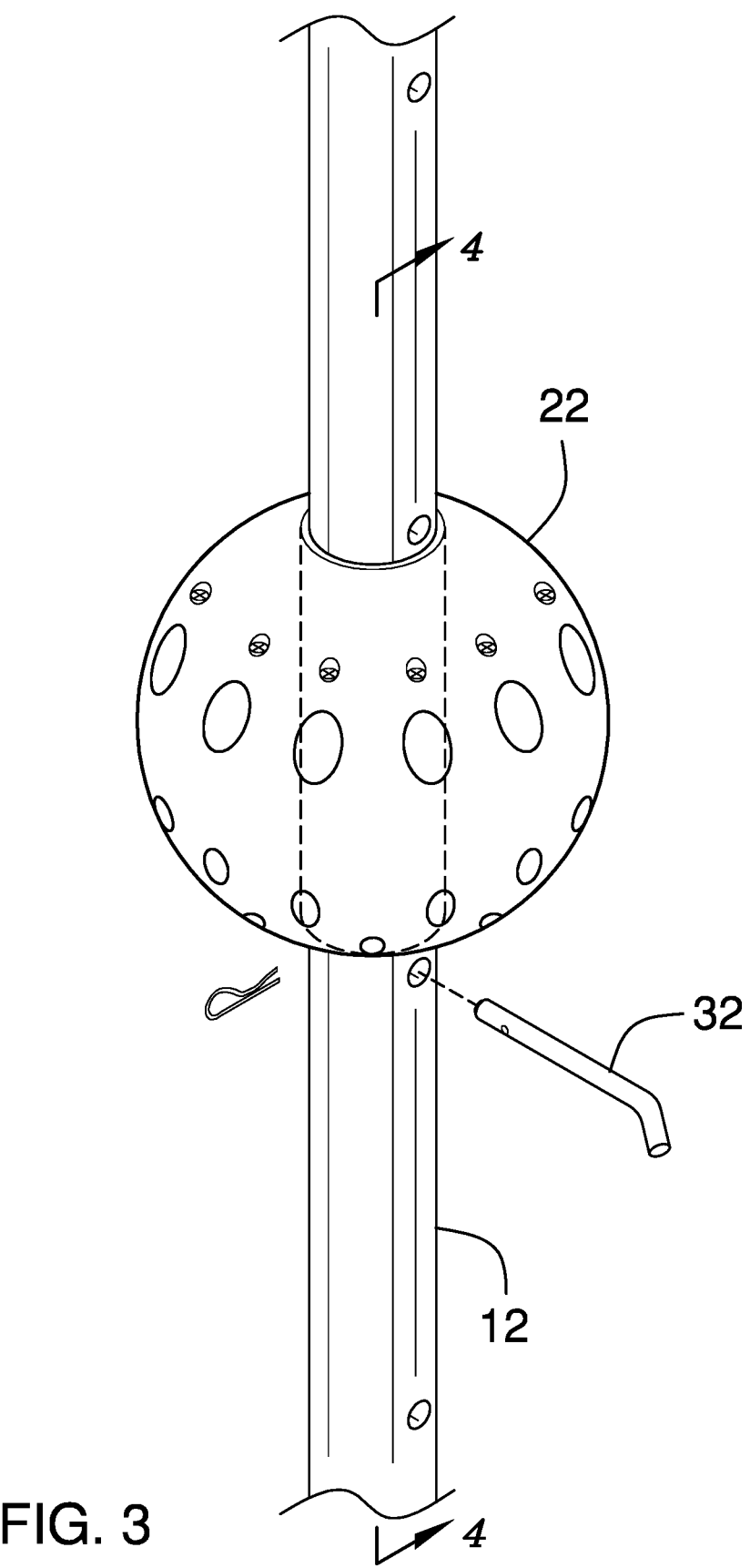
FIG. 3 is a perspective view of globe, a pole and a pin of an embodiment of the disclosure.
Figure 4:
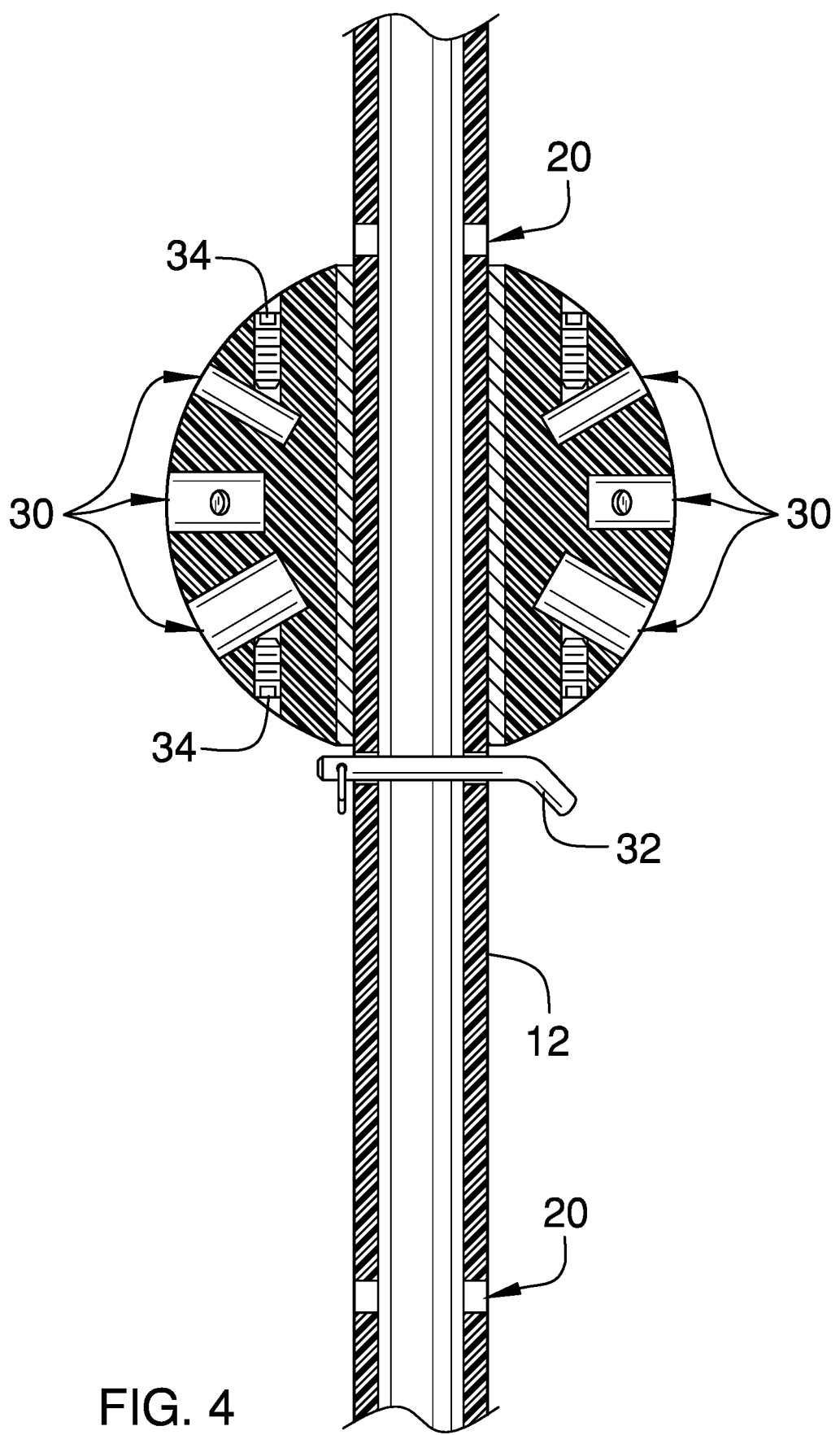
FIG. 4 is a cross sectional view taken along line 4-4 of FIG. 3 of an embodiment of the disclosure.
Figure 5:
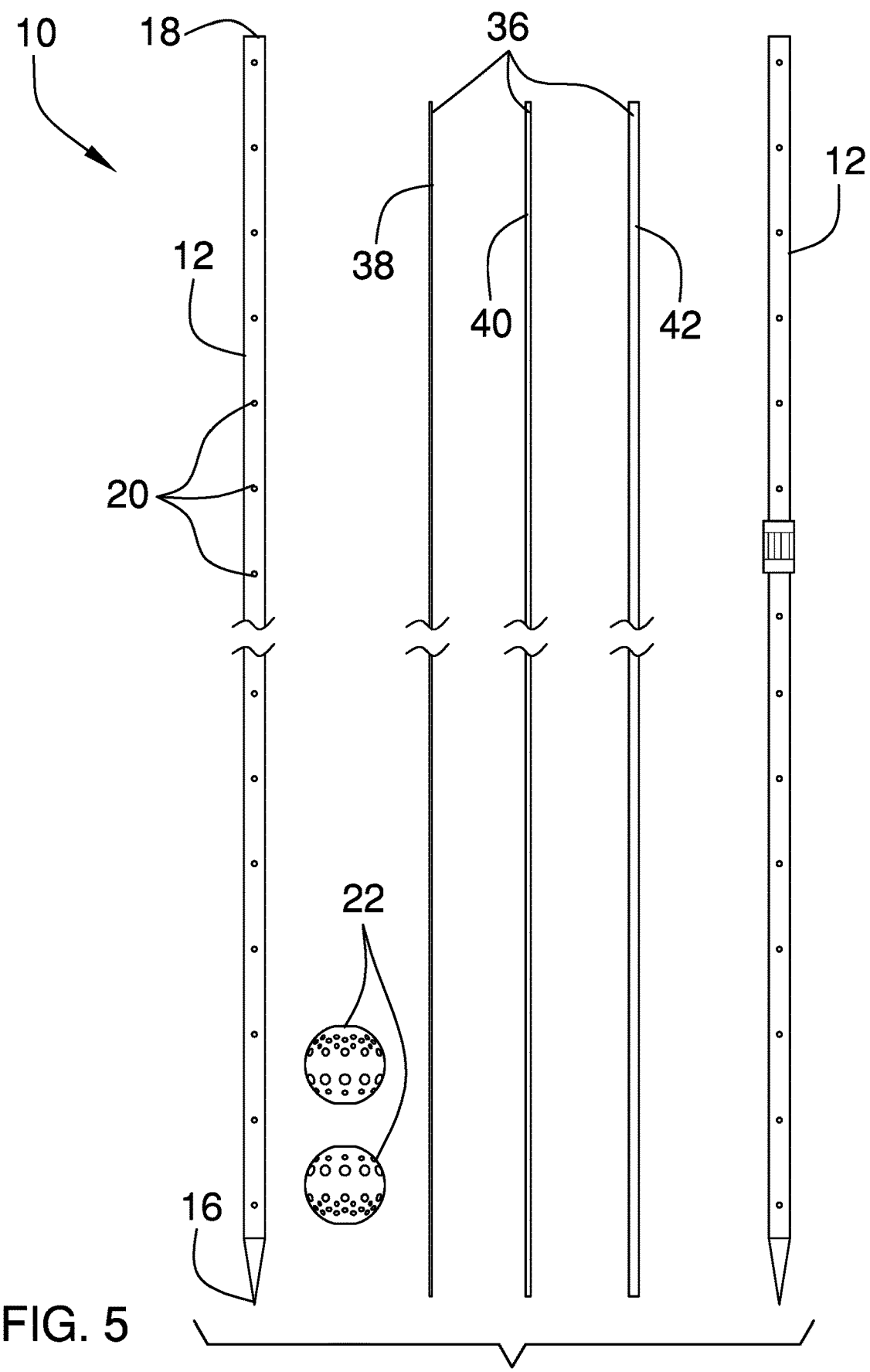
FIG. 5 is a perspective view of an embodiment of the disclosure.

With reference now to the drawings, and in particular to FIGS. 1 through 8 thereof, a new net device embodying the principles and concepts of an embodiment of the disclosure and generally designated by the reference numeral 10 will be described.

As best illustrated in FIGS. 1 through 8, the tree net assembly 10 generally comprises a pole 12 that is vertically oriented and is positioned adjacent to a plant 14. The plant 14 may be a tree, a bush, a vegetable plant and any other plant that has foliage that is vulnerable to animal pests. The pole 12 has a first end 16 and a second end 18, and the pole 12 has a plurality of apertures 20 extending therethrough. The apertures 20 are spaced apart from each other and are distributed between the first end 16 and the second end 18. The first end 16 tapers to a point for piercing the ground.

A pair of globes 22 is provided and each of the globes 22 is slidably positioned around the pole 12. Each of the globes 22 has an outer surface 24 and each of the globes 22 has a hole 26 extending therethrough. The hole 26 in each of the globes 22 extends through a center of the globes 22 to define a first opening 27 and a second opening 28 in the outer surface 24 in each of the globes 22. The hole 26 in each of the globes 22 insertably receives the pole 12 such that each of the globes 22 is positionable to be aligned with a selected one of the apertures 20 in the pole 12. Additionally, the globes 22 are spaced a selected distance apart from each other on the pole 12.

The outer surface 24 of each of the globes 22 has a plurality of wells 30 each extending toward a center of a respective one of the globes 22. The wells 30 in each of the globes 22 is arranged to form a plurality of rows of wells 30 each extending around a respective one of the globes 22. The rows of wells 30 are oriented collinear with an equator of the respective globe 22. Additionally, the rows of wells 30 are spaced apart from each other and are distributed between the first opening 27 and the second opening 28 in the respective globe 22.

Each of the rows of wells 30 has a unique diameter with respect to each other. Moreover, each of the wells 30 in each of the rows of wells 30 extends toward a center of the respective globe 22. Thus, each of the rows of wells 30 is oriented at a respective angle with the equator on the respective globe 22. The globes 22 are oriented on the pole 12 such that selected rows of wells 30 on the globes 22 are directed toward each other.

A pair of pins 32 is provided and each of the pins 32 is extendable through a selected one of the apertures 20 in the pole 12. Each of the globes 22 rests on a respective one of the pins 32 to retain each of the globes 22 at the selected point along the pole 12. A plurality of set screws 34 is provided and each of the set screws 34 extends through the outer surface 24 of a respective one of the globes 22. Each of the set screws 34 is aligned with a respective one of the wells 30 in the respective globe 22 and each of the set screws 34 is selectively screwed into the respective well.

A plurality of rods 36 is provided and each of the rods 36 is comprised of a resiliently bendable material. Each of the rods 36 is removably coupled between the globes 22 when the globes 22 are positioned on the pole 12. The globes 22 are spaced apart from each other a distance that is less than a length of the rods 36. Thus, the rods 36 curve outwardly from the pole 12 when the rods 36 are coupled between the globes 22 thereby facilitating the plurality of rods 36 to define a sphere surrounding the plant 14.

The plurality of rods 36 includes a set of first rods 38, a set of second rods 40 and a set of third rods 42. Each of the first 38, second 40 and third 42 sets of rods has a unique diameter with respect to each other. Moreover, each of the first 38, second 40 and third 42 sets of rods is chosen to define a sphere of a selected size. Each of the first rods 38 is inserted into the wells 30 that have a corresponding diameter in each of the globes 22 to define a minimum sized sphere. Each of the second rods 40 is inserted into the wells 30 that have a corresponding diameter in each of the globes 22 to define a medium sized sphere. Each of the third rods 42 is inserted into wells 30 that have a corresponding diameter in each of the globes 22 to define a maximum sized sphere. Each of the third rods 42 may have a length that is greater than a length of each of the second rods 40, and each of the first rods 38 may have a length that is less than the length of each of the second rods 40.

Figure 6:
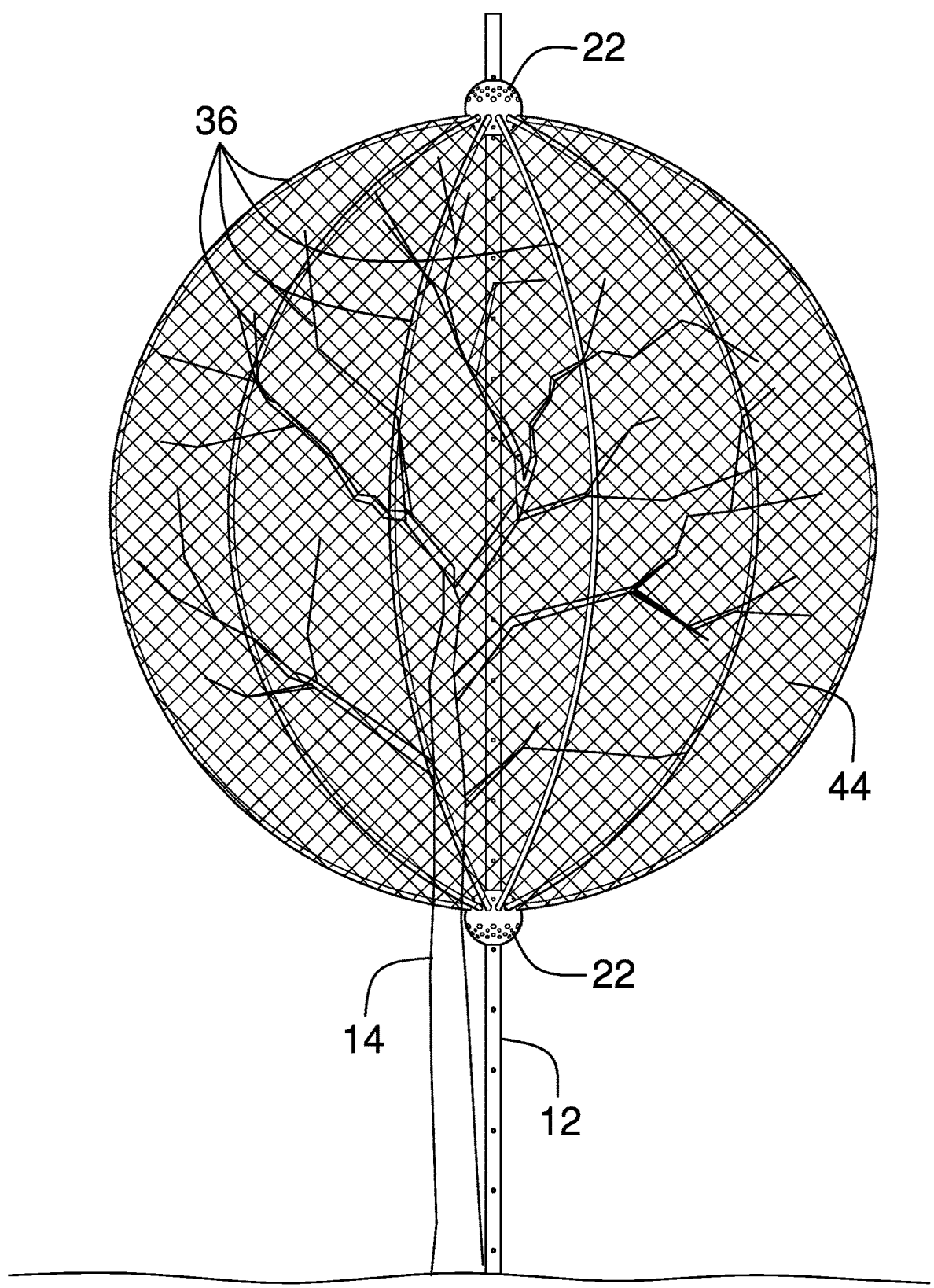
FIG. 6 is a perspective in-use view of an embodiment of the disclosure showing a tree being surrounded by a net.
Figure 7:
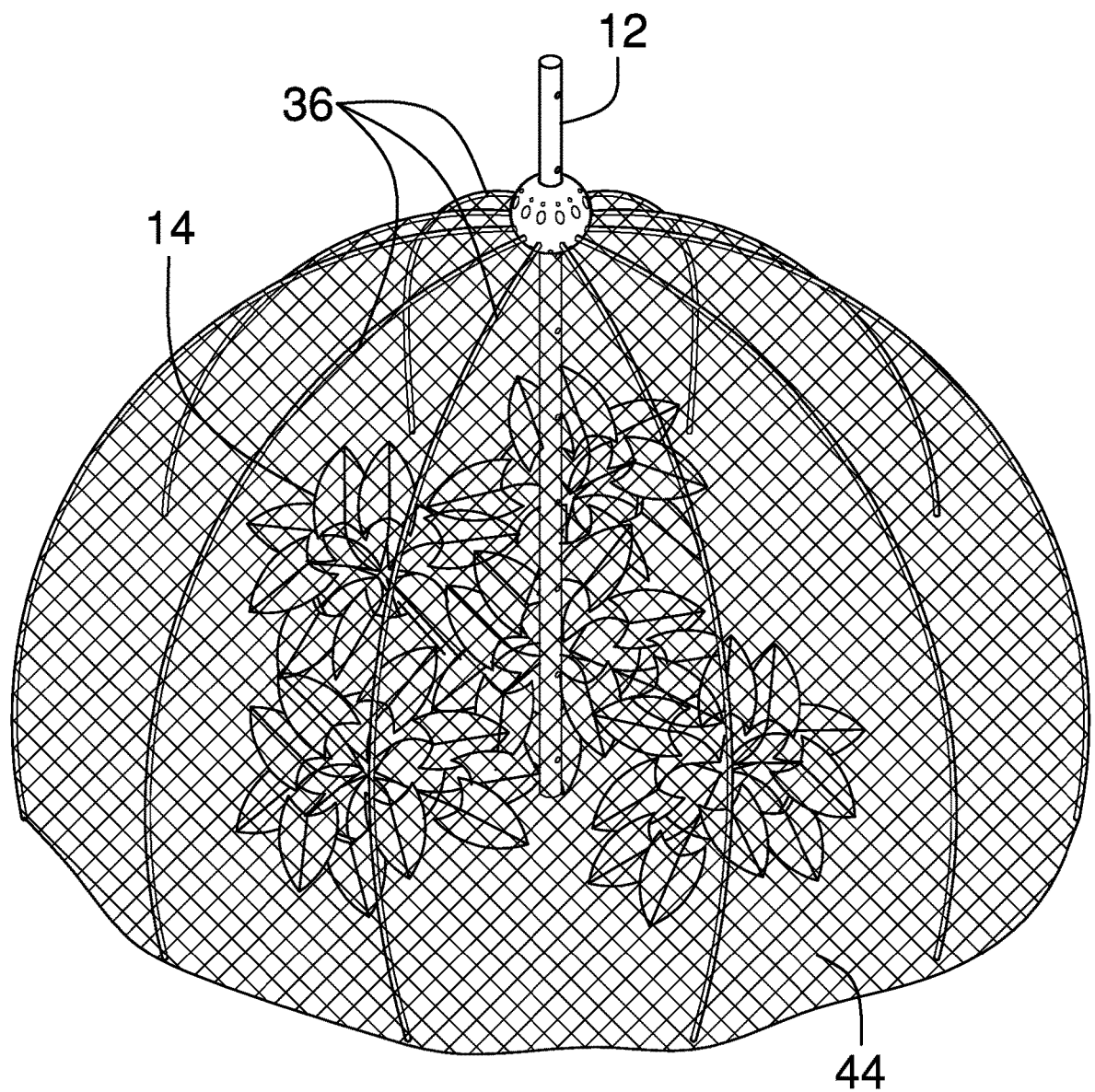
FIG. 7 is a perspective in-use view of an embodiment of the disclosure showing a bush being covered by a net.
Figure 8:
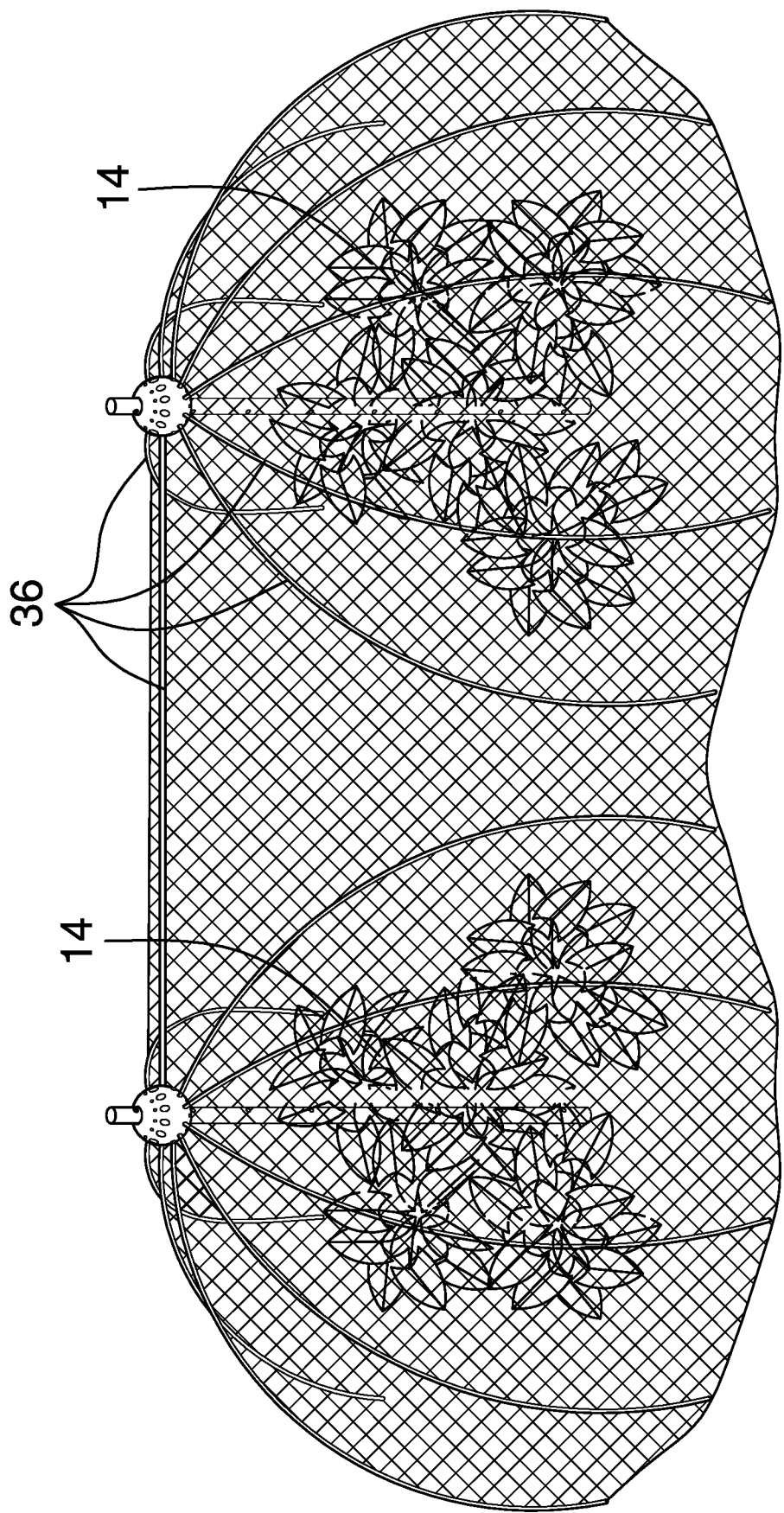
FIG. 8 is a perspective in-use view of an embodiment of the disclosure showing a plurality of bushes being covered by a net.

A net 44 is provided and the net 44 is positionable around the rods 36 when the rods 36 are positioned in the globes 22. In this way the net 44 surrounds the plant 14 to inhibit the animal pests from accessing the plant 14. As shown in FIG. 7, a single globe 22 may be positioned on the pole 12 and the rods 36 may be positioned to extend between the single globe 22 and the ground. In this way a bush, flower or other low growing plant can be covered. As shown in FIG. 6, both of the globes 22 are positioned on the pole 12 and the rods 36 forms the sphere around the tree or other high growing plant. As shown in FIG. 8, a plurality of poles 12 may be connected together with a horizontally oriented rod 36 thereby facilitating the net 44 to cover a plurality of plants 14.

In use, the first end 16 of the pole 12 is inserted into the ground such that the pole 12 is vertically oriented next to the plant 14. Each of the globes 22 is slid onto the pole 12 and the globes 22 are positioned above and below foliage on the plant 14. The pins 32 are extended through the selected apertures 20 in the pole 12 to retain each of the globes 22 at the selected point along the pole 12. One of the first 38, second 40 or third 42 sets of rods is chosen and is each inserted into corresponding wells 30 in each of the globes 22. Thus, the rods 36 curve outwardly from the pole 12 to define the sphere that surrounds the foliage on the plant 14. The appropriate set screws 34 are tightened against the rods 36 thereby retaining the rods 36 in the globes. The net 44 is positioned around the rods 36 to encircle the plant 14 and thusly inhibit animal pests from accessing the foliage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tree net assembly being configured to surround a tree thereby protecting the tree from animal pests, said assembly comprising:

a pole being vertically oriented and being positioned adjacent to a plant;

a pair of globes, each of said globes being slidably positioned around said pole, each of said globes having a plurality of wells each extending toward a center of a respective one of said globes;

a plurality of rods, each of said rods being comprised of a resiliently bendable material, each of said rods being removably coupled between said globes when said globes are positioned on said pole, said globes being spaced apart from each other a distance being less than a length of said rods such that said rods curve outwardly from said pole when said rods are coupled between said globes thereby facilitating said plurality of rods to define a sphere surrounding the plant; and a net being positionable around said rods when said rods are positioned in said globes having said net surrounding the plant wherein said net is configured to inhibit animal pests from accessing the plant.

2. The assembly according to claim 1, wherein said pole has a first end and a second end, said pole having a plurality of apertures extending therethrough, said apertures being spaced apart from each other and being distributed between said first end and said second end, said first end tapering to a point for piercing the ground.

3. The assembly according to claim 2, wherein each of said globes has an outer surface, each of said globes having a hole extending therethrough, said hole in each of said globes extending through a center of said globes to define a first opening and a second opening in said outer surface in each of said globes, said hole in each of said globes insertably receiving said pole such that each of said globes is positionable to be aligned with a selected one of said apertures in said pole having said globes being spaced a selected distance apart from each other.

4. The assembly according to claim 3, further comprising a pair of pins, each of said pins being extendable through a selected one of said apertures in said pole, each of said globes resting on a respective one of said pins to retain each of said globes at said selected one of said apertures in said pole.

5. The assembly according to claim 4, further comprising a plurality of set screws, each of said set screws extending through said outer surface of a respective one of said globes, each of said set screws being aligned with a respective one of said wells in said respective globe, each of said set screws being selectively screwed into said respective well.

6. The assembly according to claim 3, wherein each of said globes has an outer surface, said outer surface of each of said globes having a plurality of wells each extending toward a center of a respective one of said globes, said wells in each of said globes being arranged to form a plurality of rows of wells each extending around a respective one of said globes, said rows of wells being oriented collinear with an equator of said respective globe, said rows of wells being spaced apart from each other and being distributed between said first opening and said second opening in said respective globe.

7. The assembly according to claim 6, wherein each of said rows of wells has a unique diameter with respect to each other, each of said wells in each of said rows of wells extending toward a center of said respective globe such that each of said rows of wells is oriented at a respective angle with said equator on said respective globe, each of said globes being oriented on said pole having selected rows of wells on said globes being directed toward each other.

8. The assembly according to claim 7, wherein said plurality of rods includes a set of first rods, a set of second rods and a set of third rods, each of said first, second and third sets of rods having a unique diameter with respect to each other, each of said first, second and third sets of rods being chosen to define a sphere of a selected size.

9. The assembly according to claim 8, wherein each of said first rods is inserted into wells having a corresponding diameter in each of said globes to define a minimum sized sphere.

10. The assembly according to claim 9, wherein each of said second rods is inserted into wells having a corresponding diameter in each of said globes to define a medium sized sphere.

11. The assembly according to claim 10, wherein each of said third rods is inserted into wells having a corresponding diameter in each of said globes to define a maximum sized sphere.

12. A tree net assembly being configured to surround a tree thereby protecting the tree from animal pests, said assembly comprising:
   a pole being vertically oriented and being positioned adjacent to a plant, said pole having a first end and a second end, said pole having a plurality of apertures extending therethrough, said apertures being spaced apart from each other and being distributed between said first end and said second end, said first end tapering to a point for piercing the ground;
   a pair of globes, each of said globes being slidably positioned around said pole, each of said globes having an outer surface, each of said globes having a hole extending therethrough, said hole in each of said globes extending through a center of said globes to define a first opening and a second opening in said outer surface in each of said globes, said hole in each of said globes insertably receiving said pole such that each of said globes is positionable to be aligned with a selected one of said apertures in said pole having said globes being spaced a selected distance apart from each other, said outer surface of each of said globes having a plurality of wells each extending toward a center of a respective one of said globes, said wells in each of said globes being arranged to form a plurality of rows of wells each extending around a respective one of said globes, said rows of wells being oriented collinear with an equator of said respective globe, said rows of wells being spaced apart from each other and being distributed between said first opening and said second opening in said respective globe, each of said rows of wells having a unique diameter with respect to each other, each of said wells in each of said rows of wells extending toward a center of said respective globe such that each of said rows of wells is oriented at a respective angle with said equator on said respective globe, each of said globes being oriented on said pole having selected rows of wells on said globes being directed toward each other;
   a pair of pins, each of said pins being extendable through a selected one of said apertures in said pole, each of said globes resting on a respective one of said pins to retain each of said globes at said selected one of said apertures in said pole;
   a plurality of set screws, each of said set screws extending through said outer surface of a respective one of said globes, each of said set screws being aligned with a respective one of said wells in said respective globe, each of said set screws being selectively screwed into said respective well;
   a plurality of rods, each of said rods being comprised of a resiliently bendable material, each of said rods being removably coupled between said globes when said globes are positioned on said pole, said globes being spaced apart from each other a distance being less than a length of said rods such that said rods curve outwardly from said pole when said rods are coupled between said globes thereby facilitating said plurality of rods to define a sphere surrounding the plant, said plurality of rods including a set of first rods, a set of second rods and a set of third rods, each of said first, second and third sets of rods having a unique diameter with respect to each other, each of said first, second and third sets of rods being chosen to define a sphere of a selected size, each of said first rods being inserted into wells having a corresponding diameter in each of said globes to define a minimum sized sphere, each of said second rods being inserted into wells having a corresponding diameter in each of said globes to define a medium sized sphere, each of said third rods being inserted into wells having a corresponding diameter in each of said globes to define a maximum sized sphere; and
   a net being positionable around said rods when said rods are positioned in said globes having said net surrounding the plant wherein said net is configured to inhibit animal pests from accessing the plant.

* * * * *